(12) United States Patent
Frerking et al.

(10) Patent No.: US 8,442,596 B2
(45) Date of Patent: *May 14, 2013

(54) HEARING ASSISTIVE SYSTEM WITH LOW POWER INTERFACE

(75) Inventors: Melvin Frerking, Norcross, GA (US); George Hirvela, Carrollton, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/586,105

(22) Filed: Aug. 15, 2012

(65) Prior Publication Data

US 2012/0308059 A1 Dec. 6, 2012

Related U.S. Application Data

(63) Continuation of application No. 12/579,883, filed on Oct. 15, 2009, now Pat. No. 8,265,710, which is a continuation of application No. 11/247,746, filed on Oct. 7, 2005, now Pat. No. 7,620,429.

(51) Int. Cl.
*H04B 1/38* (2006.01)

(52) U.S. Cl.
USPC ..... 455/569.1; 455/557; 455/41.2; 455/426.1

(58) Field of Classification Search ............... 455/569.1, 455/556.1, 552.1, 41.2, 426.1, 11.1, 456.1, 455/41.1, 41.3, 550.1, 557, 90.1, 9, 67.11, 455/458, 555; 381/315, 312, 323, 317
See application file for complete search history.

(56) References Cited

U.S. PATENT DOCUMENTS

| | | | |
|---|---|---|---|
| 4,697,283 A | | 9/1987 | Lafrance |
| 5,086,464 A | | 2/1992 | Groppe |
| 5,615,229 A | | 3/1997 | Sharma |
| 5,835,610 A | * | 11/1998 | Ishige et al. .................. 381/315 |
| 5,842,115 A | | 11/1998 | Dent |
| 5,991,420 A | | 11/1999 | Stern |
| 6,078,675 A | | 6/2000 | Bowen-Nielsen |
| 6,694,034 B2 | * | 2/2004 | Julstrom et al. .............. 381/315 |
| 6,694,143 B1 | | 2/2004 | Beamish et al. |
| 6,879,695 B2 | | 4/2005 | Maltan |
| 6,925,179 B2 | | 8/2005 | Waldron |
| 2003/0045283 A1 | | 3/2003 | Hagedoorn |
| 2005/0069161 A1 | | 3/2005 | Kaltenbach et al. |
| 2006/0025172 A1 | | 2/2006 | Hawker |
| 2006/0126873 A1 | | 6/2006 | Lee |
| 2006/0147069 A1 | | 7/2006 | Svajda |
| 2006/0188116 A1 | * | 8/2006 | Frerking et al. .............. 381/315 |

* cited by examiner

*Primary Examiner* — John J Lee
(74) *Attorney, Agent, or Firm* — Parks IP Law LLC; Jennifer P. Medlin Esq.

(57) ABSTRACT

A communications interface provides for communications between a wireless communication device and a hearing assistive device. The communications interface converts a signal, including an audio signal, received from the wireless communication device into a format recognizable by a hearing assistive device. The communications interface generates a communication signal including the audio signal based on the converted signal and transmits the communication signal to the hearing assistive device using a low power radio frequency transmission protocol. The hearing assistive device converts the communication signal received from the communications interface into a usable format, extracts an audible signal from the communication signal, and manipulates the extracted audible signal according to a criterion associated with a user of the hearing assistive device.

12 Claims, 5 Drawing Sheets

HEARING ASSISTIVE SYSTEM WITH LOW POWER INTERFACE

CROSS-REFERENCE TO RELATED APPLICATION

This application is a continuation of U.S. application Ser. No. 12/579,883, filed Oct. 15, 2009 now U.S. Pat. No. 8,265,710, which is a continuation of U.S. application Ser. No. 11/247,746, filed Oct. 7, 2005 (now U.S. Pat. No. 7,620,429), the entireties of which are herein incorporated by reference.

TECHNICAL FIELD

The present disclosure relates to wireless communications, and more particularly, to a wireless interface for managing communications between a wireless communications device and a hearing assistive device.

BACKGROUND

A Hearing Assistive Device (HAD), such as a hearing aid, is typically worn at the ear of a user and includes a microphone and a telecoil for receiving audio input. In microphone mode, sound waves are received by the microphone and converted into electrical energy, and the resultant electrical signal is then amplified, processed, and output to the user. In telecoil mode, a telecoil is coupled to an inductive field of a hearing aid compatible device, such as a telephone, to receive audio signals and the signals are amplified, processed, and output to the user.

When using a Wireless Communications Device (WCD), such as a cellular telephone, a HAD user typically places the WCD proximate the HAD in order for the HAD microphone to receive sound emitted from the WCD's speaker. However, the close proximity of the WCD to the HAD may result in unwanted interference as varying RF and magnetic fields associated with the WCD are detected and processed as electrical signals by the HAD. For example, RF interference may result when radio waves emitted by a cellular telephone are detected and demodulated by the HAD circuitry. Wireless devices that employ time division multiplexed modulation schemes may generate interference due to the on/off keying of their modulation envelopes. The pulsing transmissions of such devices may produce interference at the fundamental frequencies associated with the pulse rates, as well as at the associated harmonic frequencies across the audible spectrum.

In addition to RE interference, wireless devices may also generate magnetic interference when placed proximate a HAD. Cellular telephone electronics, such as backlighting, displays, keypads, battery leads and circuit boards may generate pulsed magnetic fields. The resultant magnetic field energy may be coupled with the HAD's wiring and interconnections and result in interference.

Thus, when a WCD is placed proximate a HAD, such as the standard usage position when the WCD's speaker is placed proximate the HAD, unwanted electronic interference often results. Such interference can be diminished by moving the interfering device a distance away from the HAD. Generally speaking, the interference ratio experienced by a hearing aid user as a wireless device is pulled away from the hearing aid is generally represented by a squared relationship. For example, if a wireless device is moved from a first distance x from a hearing aid to a second distance 2x, then the interference generated at the distance 2x is one-quarter that of the interference generated at the distance x. Thus, the interference generated by a WCD may be greatly reduced by moving the WCD a distance from the HAD. Of course, a significant obstacle to moving such devices away from the HAD is the decreased ability of the HAD user to communicate with the WCD, such as the ability to receive audio output from the WCD speaker or to provide speech to the WCD microphone.

SUMMARY

The present disclosure provides apparatus, systems, and methods that enable communications between a Hearing Assistive Device (HAD), such as a hearing aid, and a Wireless Communications Device (WCD), such as a cellular telephone, while mitigating unwanted interference. Here a WCD includes any audio device equipped to receive and transmit, via a short range communication protocol, any distinguishable sound wave including cell phones, audio file decoders such as but not limited to MP3 players, radios, televisions, computers, devices enabled with short range transmitters, and the like or parts thereof. In one exemplary embodiment, a system is provided in which signals received at a WCD are provided to a HAD via a Low Power RF Interface. In another embodiment, the Interface may also receive input from a HAD user, such as the user's speech, and provide associated voice signals to the WCD.

The system can include a Bluetooth-enabled Wireless Communications Device (BWCD), an RF-enabled Hearing Assistive Device (RHAD), and an Interface for providing communication between the BWCD and the RHAD. The Interface can receive voice signals from the BWCD via a Bluetooth signal and provide the voice signals to the RHAD via a low power RF signal. This arrangement enables the BWCD to be moved a distance away from the RHAD to decrease potential interference at the RHAD, while still allowing the RHAD user to communicate using the BWCD. For example, the RHAD user can use the BWCD to communicate with the user of another communications device over a telecommunications network.

While embodiments of the disclosure are described with regard to specific communication protocols and standards, such as Bluetooth, those skilled in the art will recognize that embodiments of the disclosure that are short range communication enabled may include a broad range of protocols or standards. Means for short range communication include IEEE 802.11, 802.15.1 (Bluetooth and Bluetooth lite), 802.15.4a (Zigbee), 802.15.3 (Ultra Wideband), IrDa, near-field communications (NFC), active radio-frequency identification (active RFID), low power FM, propriety standards, and other low power wireless transceivers. Accordingly, although the illustrated embodiments teach the present disclosure by way of a Bluetooth protocol, this is for purposes of illustration only and not limitation as all means for short range communication are contemplated and many are shown immediately above.

In an exemplary embodiment, the Interface can be provided with a Bluetooth module to establish a communications link with the BWCD and receive a Bluetooth signal in accordance with Bluetooth protocol. The Interface also can be provided with a Low Power RF module to establish a communications link with a RHAD and transmit low power RF signals to the RHAD. The Interface may also include control logic to execute control instructions, a user interface, a CODEC Processor for processing signals, and a power source.

In another exemplary embodiment, the Interface includes a microphone for receiving speech from an RHAD user and transmitting associated voice signals to the BWCD. The Interface can be provided with a housing that is adapted for placing the Interface a distance from the RHAD, such as means for attaching the Interface to the clothing of a user.

The RHAD can include RF Communications Logic for receiving low power RF signals from the Interface. The RHAD RF Communications Logic is adapted for communications with the Interface's Low Power RF Communications Logic. The RHAD also can include a Hearing Assistive Module for receiving and processing signals in accordance with the hearing deficiencies of the RHAD user.

The present disclosure also includes a method for communicating with a HAD. In an exemplary embodiment the method includes receiving a short range communication signal from a wireless communications device at an Interface, extracting an audible signal from the short range signal, and transmitting the audible signal to the RHAD via a low power RF signal.

An exemplary embodiment of the present disclosure is a communications interface including a first communications module adapted to receive a communication signal, which itself includes an audible signal, from a wireless communications device, and a second communications module adapted to receive and provide that audible signal to a hearing assistive device. Here the interface receives the audible signal via a first communication protocol and sends the audible signal via a second communication protocol. Another exemplary embodiment of the present disclosure is a hearing assistive device including communications logic configured to receive a communication signal via a short range communication protocol and hearing assistive circuitry in communication with the logic, wherein the circuitry is configured to manipulate the signal in accordance with the user's hearing criteria. Still another exemplary embodiment includes radio frequency (RF) communications logic adapted to receive a low power RF signal from an interface, and housing adapted to communicatively couple the logic to a hearing assistive device.

An exemplary system of the present disclosure includes an interface and an RF enabled hearing assistive device. Here, the interface includes a first module adapted to receive an audible signal from a wireless device and a second module adapted to provide the audible signal to the hearing assistive device via a low power RF signal. Exemplary methods of the present disclosure include receiving at an interface a communication from a wireless device, extracting a desired signal from the communication at a first module of the interface, and providing the desired signal to a second module in communication with a hearing assistive device. Here, the communication is received by a first short range protocol and the signal is sent by a second short range protocol. Additional exemplary methods include receiving a low power RF signal from an interface at a hearing assistive device, extracting an audible signal from the RF signal, and providing the audible signal to a speaker of a hearing assistive device.

The devices, systems and methods of the disclosure enable a HAD user to communicate using a WCD without undue interference. Interference is reduced by allowing a WCD to be positioned at a distance from a user's HAD. The magnitude of the low power RF signal used by the Interface to transmit a voice signal to the RHAD is such that it does not produce interference at the RHAD. Because the Interface also can be provided at a distance from the RHAD, the electromagnetic fields generated by the Interface's power source do not interfere with the RHAD. Furthermore, because the Bluetooth signals between the Interface and the BWCD are frequency hopped, the interference with the RHAD due to the Bluetooth signal is negligible.

DETAILED DESCRIPTION

As required, detailed embodiments are disclosed herein. It must be understood that the disclosed embodiments are merely exemplary, and that concepts of the present disclosure may be embodied in various and alternative forms, and combinations thereof. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Embodiments of the present disclosure described herein provide a Hearing Assistive Device (HAD) and an Interface that provides a communications link between the HAD and a Wireless Communications Device (WCD), thereby allowing communication between a HAD and a WCD without undue interference. While embodiments of the disclosure are described with regard to specific communication protocols and standards, such as Bluetooth, those skilled in the art will recognize that embodiments of the disclosure that are short range communication enabled may include a broad range of protocols or standards, such as means for short range communication presented above. In the illustrated embodiments the HAD is RF enabled and the WCD is Bluetooth enabled. Similarly, embodiments include a HAD including any suitable low power wireless system configured to receive a signal from the Interface. In some embodiments the HAD includes the same short range communication enablement as the WCD.

Figure 1:
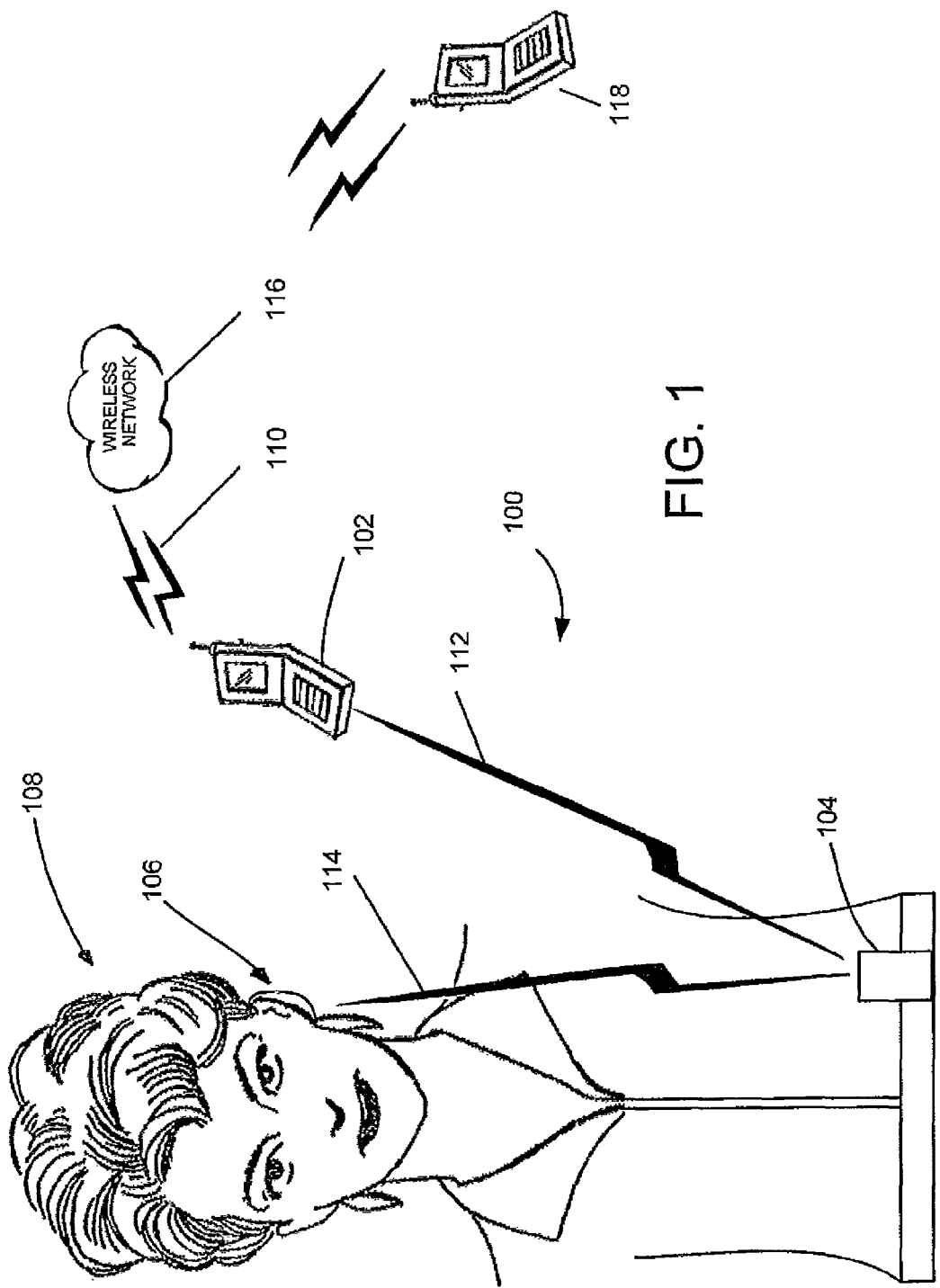
FIG. 1 illustrates a Hearing Assistive System with Low Power Interface, in accordance with an exemplary embodiment of the present disclosure.

Referring now to the drawings, wherein like numerals represent like elements throughout, FIG. 1 illustrates a Hearing Assistive System (HAS) 100, in accordance with an exemplary embodiment of the present disclosure. The illustrated HAS 100 includes a Bluetooth-enabled Wireless Communications Device (BWCD) 102, an Interface 104, and a RF-enabled Hearing Assistive Device (RHAD) 106.

As shown in FIG. 1, the BWCD 102, which for purposes of teaching and not limitation is illustrated in the form of a cellular telephone, can communicate over a telecommunications network. In this example, the BWCD 102 is shown communicating with another communications device 118 over a cellular telecommunications network 116. The cellular telecommunications network 116 may be connected with other networks such as a Public Switched Telephone Network (PSTN), the Internet, and other private or public networks. The BWCD 102 is Bluetooth-enabled so that it may establish communication with other Bluetooth-enabled devices in accordance with that communication protocol.

The Interface 104 is adapted for establishing a communications link with the BWCD 102. Here the Interface is Bluetooth-enabled so that it may establish a Bluetooth communications link with the BWCD 102 to form a piconet. In the illustrated embodiment the BWCD 102 serves as a master and the Interface 104 as a slave under the Bluetooth protocol.

The BWCD 102 receives a communication signal 110 from another communications device 118, such as a cellular telecommunications signal received during a communication session between the BWCD 102 and the communications device 118. Typically the BWCD 102 extracts desired audible signals from the cellular communications signal and those desired audible signals are output at the speaker of the BWCD. Here, desired or audible signals include all signals intended to be heard by the user 108, including voice and music. In this case, the voice signals may be converted to Bluetooth format and transmitted to the Interface 104 via a Bluetooth signal 112. The Interface 104 receives the Bluetooth Signal 112 from the BWCD 102 and processes the Bluetooth signal 112 to extract the audible signals.

The Interface 104 then transmits the audible signals to the RHAD 106 via a low power RF signal 114. A low power RF device operates at a power level much lower than a typical communication device, such as a cellular telephone, and low power RF signals do not generate interference at the RHAD 106 because of significantly reduced transmit power and/or because of the use of spread spectrum modulation (CMDA). The low power RF signal 114 is received by the RHAD 106 and the audible signals are extracted. The audible signals can be further processed by the RHAD 106 in accordance with the needs of the RHAD user 108, and then output to the RHAD user 108 at a RHAD speaker. In this way, signals received at the BWCD 102 over the cellular telecommunications network 116 can be provided to the RHAD 106 by the Interface 104.

As shown in FIG. 1, the Interface 104 can be provided at a distance from the RHAD 106, such as at the user's waist, to decrease electromagnetic interference at the RHAD 106 that may result from operation of the Interface 104. That is, by providing the Interface 104 at a distance from the RHAD 106, the energy from the Interface's power source does not interfere with the RHAD 106. In addition, the low power RF signal 114 is of a sufficiently small magnitude so as to not interfere with the RHAD 106.

The provision of the audible signals to the RHAD 106 by the low power RF signal 114 from the Interface 104 eliminates the need of the user 108 to hold the BWCD 102 proximate the RHAD 106. Under this arrangement it is not necessary that an RF microphone receive output from the BWCD speaker; rather an RF receiver may receive signals via a low power RF signal 114. No longer needing to have the BWCD 102 speaker proximate the RHAD 106, the user 108 may move the BWCD 102 a distance away from the RHAD 106, thereby reducing interference. In the case where a user 108 desires to provide speech directly to the BWCD 102 using the BWCD's microphone, the user 108 holds the BWCD 102 at a position away from the RHAD 106 but near the user's mouth. This position would decrease the interference generated by the BWCD 102 at the RHAD 106 while still allowing the BWCD 102 microphone to receive speech of the user 108.

In alternative embodiments the Interface 104 is provided with a microphone (not shown) so that the Interface 104 may also receive the user's speech and transmit voice signals to the BWCD 102 via the Bluetooth communications link established between the Interface 104 and the BWCD 102. In that case, the Interface 104 engages in bidirectional transmission of audible signals. In embodiments where the Interface 104 includes a microphone for receiving the user's speech, the BWCD 102 can be moved an even greater distance from the user 108, as permitted by the applicable short range communication protocol so that the user 108 no longer needs to be proximate the BWCD speaker or BWCD microphone. In some embodiments the microphone is located separate from, or integral to, the HAD 106.

Figure 2:
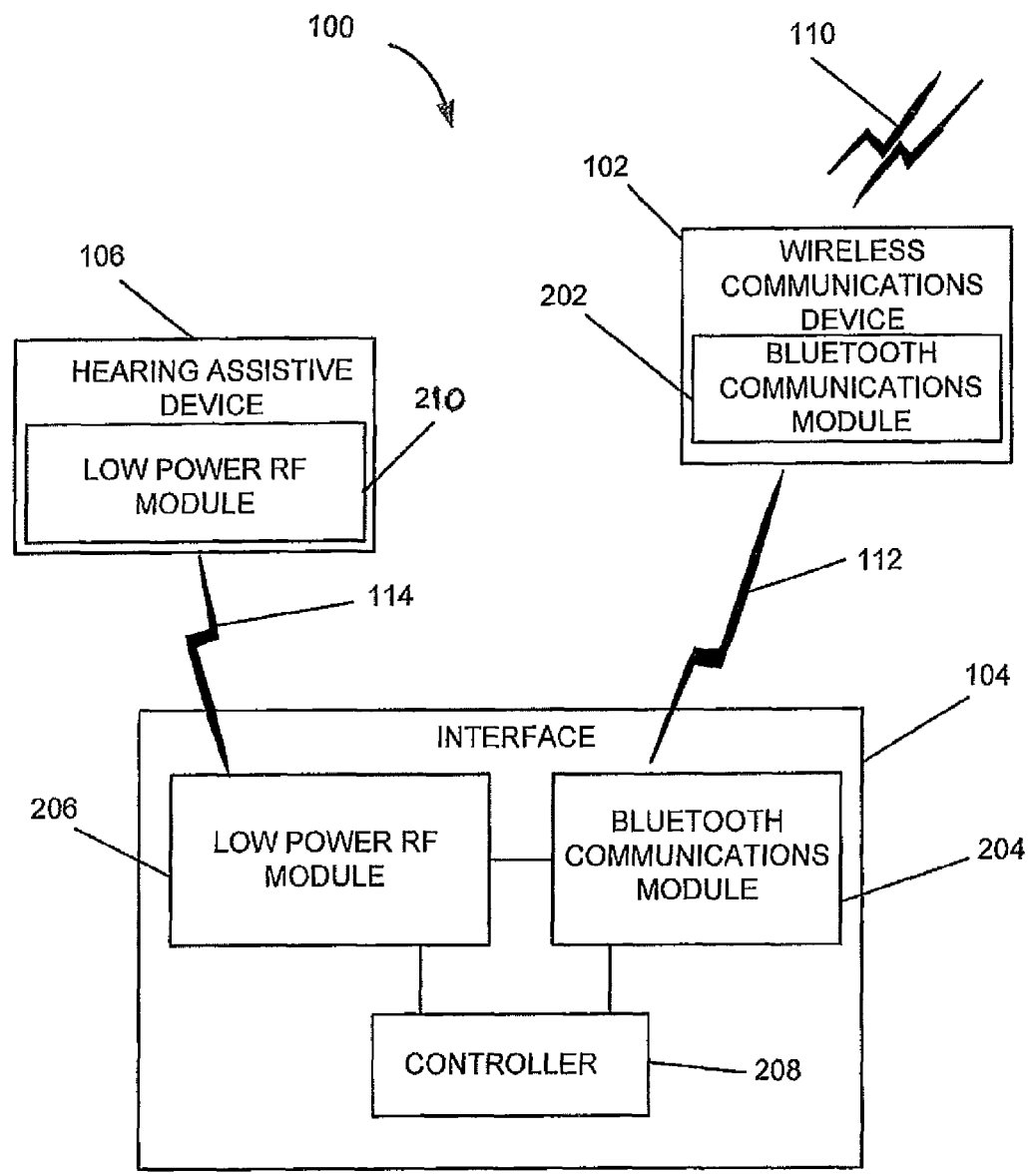
FIG. 2 illustrates a Hearing Assistive System with Low Power Interface, in accordance with an exemplary embodiment of the present disclosure.

Turning to FIG. 2, there is shown an exemplary embodiment of a HAS 100 that includes a BWCD 102. The BWCD 102 receives signals 110 from a cellular telecommunications network 116. In this example, the BWCD 102 is in the form of a Bluetooth-enabled cellular telephone. The BWCD 102 may have an integrated Bluetooth capability added during manufacture or may be upgraded to contain the Bluetooth capability after manufacture. The illustrated BWCD 102 has a Bluetooth Communications Module 202 that includes circuitry for wirelessly exchanging digitized audible signals with an external Bluetooth-enabled device, such as described immediately below.

The HAS 100 also includes an Interface 104 for communicating with the BWCD 102. The Interface 104 includes an Interface Bluetooth Communications Module (IBCM) 204 that includes Bluetooth Circuitry for wirelessly exchanging signals with another Bluetooth-enabled device, such as the BWCD 102 substantially in accordance with the Bluetooth specification. Thus, the IBCM 204 allows the Interface 104 to establish a communications link with the BWCD 102 and receive signals transmitted from the BWCD 102 via a Bluetooth signal 112.

The illustrated Interface 104 also includes means for short range communication, such as a Low Power RF Module 206. The Low Power RF Module 206 includes transceiver circuitry for establishing a communications link with the RHAD 106, and wirelessly exchanging analog or digitized audible signals with the RHAD 106 via a low power RF signal 114. The Interface 104 can further include a controller 208 having control logic for managing and controlling the IBCM 204 and the Low Power RF Module 206.

The HAS 100 may also include a RHAD 106. The illustrated RHAD 106 includes means for short range communication, such as a Low Power RF Module 210 having circuitry for establishing a Low Power RF communications link with the Interface 104, receiving Low Power RF signals 114 from the Interface 104, and processing the Low Power RF signals 114 to extract audible signals. The RHAD 106 may also include hearing assistive circuitry commonly found in hearing assistive devices for processing the audible signals in accordance with the hearing impairments of the user 108. In alternative embodiments, the RHAD 106 is a headset that the user wears on an ear. The RHAD 106 includes a hearing assistive device, means for short range communication, and a microphone for communicating to the Interface 104 or directly to the wireless communication device 102.

Figure 3:
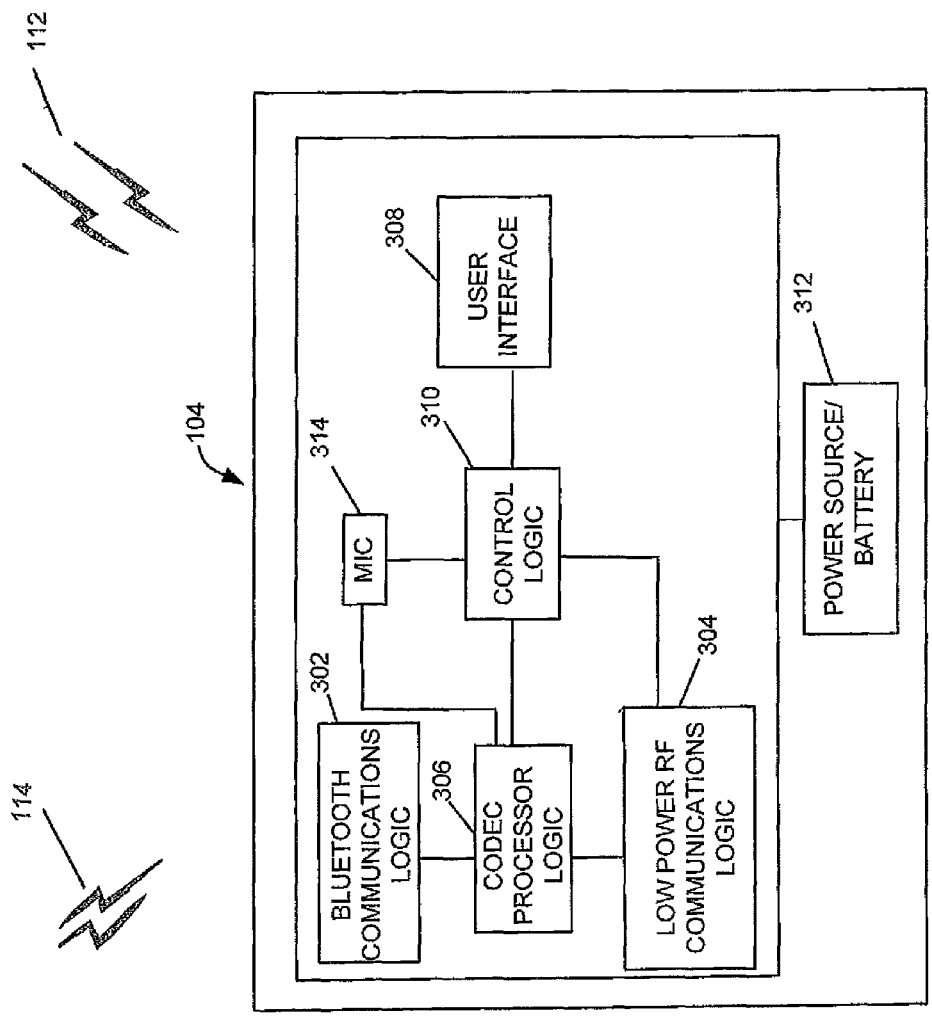
FIG. 3 illustrates a block diagram of a Low Power Interface, in accordance with an exemplary embodiment of the present disclosure.

Turning to FIG. 3, there is shown a detailed block diagram of an Interface 104 in accordance with an exemplary embodiment of the disclosure. As shown in this exemplary embodiment, the Interface 104 includes Bluetooth Communications Logic 302, Low Power RF Communications Logic 304, CODEC/Processor Logic 306, a user control interface 308, control logic 310, and a power source 312.

The Bluetooth Communications Logic 302 contains circuitry for wirelessly exchanging digitized audible signals with the BWCD 102. The Bluetooth Communications Logic 302 can perform encryption and decryption of audible signals under the Bluetooth specification for wireless communications. The Bluetooth Communications Logic 302 can include a Bluetooth chip or chipset, such as a plurality of integrated circuits that may be integrated into one or more modules and may include a variety of components for effectuating Bluetooth capability, such as a processor, a clock, a transmitter, a receiver, an antenna, and a controller.

The CODEC/Processor Logic 306 can include circuitry for performing processing functions on incoming transmissions, such as decoding, decryption, error detection, payload extraction and audio decompression functions, and circuitry for performing processing functions on outgoing transmissions, such as encoding, encryption and audio compression functions. For example, the CODEC/Processor Logic 306 can receive a digitized audible signal from the Bluetooth Communications Logic 302, decode the signal and extract desired voice or music signals. The CODEC/Processor Logic 306 can then perform processing functions, such as audio compression, encoding and other functions, on the resultant audible signal prior to delivery to the Low Power RF Communications Logic 304, and transmission to the RHAD 106.

Although the CODEC/Processor Logic 306, the Low Power RF Communications Logic 304, the Bluetooth Communications Logic 302, and the Control Logic 310 are shown as separate components, it is contemplated that the functions of these devices may be performed by a combination of the devices into a single unit and that functions discussed as being performed by one structure may alternatively be performed by other structures. For example, some of the functions discussed as being performed by the CODEC/Processor Logic 306 may be performed at the Bluetooth Communications Logic 302, the Low Power RF Communications Logic 304, or the Control Logic 310, or a combination thereof.

In an embodiment wherein the Interface 104 is provided with an integral or remote microphone 314, the microphone 314 can receive speech from the user 108 and provide associated voice signals to the CODEC/Processor Logic 306. The CODEC/Processor Logic 306 can then convert the user's voice signals into an encoded speech format for exchange with the Bluetooth Communications Logic 302. The voice signals can then be transmitted by the Bluetooth Communications Logic 302 to the BWCD 102 via a Bluetooth signal. If required, the CODEC/Processor Logic 306 may convert analog signals into digital form before converting them into an encoded speech format. The CODEC/Processor Logic 306 can then exchange the voice signals with the Bluetooth Communications Logic 302, such as by exchanging a bit stream of digitized voice signals with the Bluetooth Communications Logic 302. If data signals are provided, such as in the form of music, the CODEC/Processor Logic 306 can perform data compression and decompression as required.

The Interface 104 also includes Low Power RF Communications Logic 304 that contains circuitry for exchanging digitized or analog voice signals via a Low Power RF signal 114. The Low Power RF Communications Logic 304 can be adapted for communication with a particular type of RHAD 106 and can be adapted for communication with multiple RHADs 106, such as the case where a user 108 has a different calibrated RHAD 106 in each ear. In addition to transmitting voice signals to the RHAD 106, the Low Power RF Communications Logic 304 also can transmit and receive other data, such as control data with the RHAD 106.

The Low Power RF Communications Logic 304 includes circuitry, such as an antenna, an amplifier, a transmitter, and a processor, for performing other functions not performed by the CODEC/Processor Logic 306 to ready the signal for transmission to the RHAD 106. The Low Power RF Communications Logic 304 modulates the signal to an RF carrier, amplifies the signal as required, and transmits the signal by an antenna to the RHAD 106. The Low Power RF Communications Logic 304 can include a Low Power RF transmitter and receiver circuitry for bi-directional communication with the RHAD 106, to receive, for example, control signals from the RHAD 106 or voice signals from a microphone. For example, the Interface 104 may receive control data from the user control interface 308 to configure parameters, such as frequency channel and operational modes for transmitting audible signals to the RHAD 106.

The Bluetooth Communications Logic 302, CODEC/Processor Logic 306, Low Power RF Communications Logic 304, microphone 314, and the user control interface 308 are connected to and controlled by control logic 310. The control logic 310 can include a central processing unit (CPU) and memory, such as flash memory. The user control interface 308 can include buttons, visual indicators such as light emitting diodes (LED's) and lights, and associated drivers and logic to receive input from the user 108 and display status conditions back to the user 108, and generally provide an interface between the user 108 and the Interface 104. For example, the user control interface 308 may indicate power on-off, and establishment of communication between the Interface 104 and the BWCD 102 or the RHAD 106.

Figure 4:
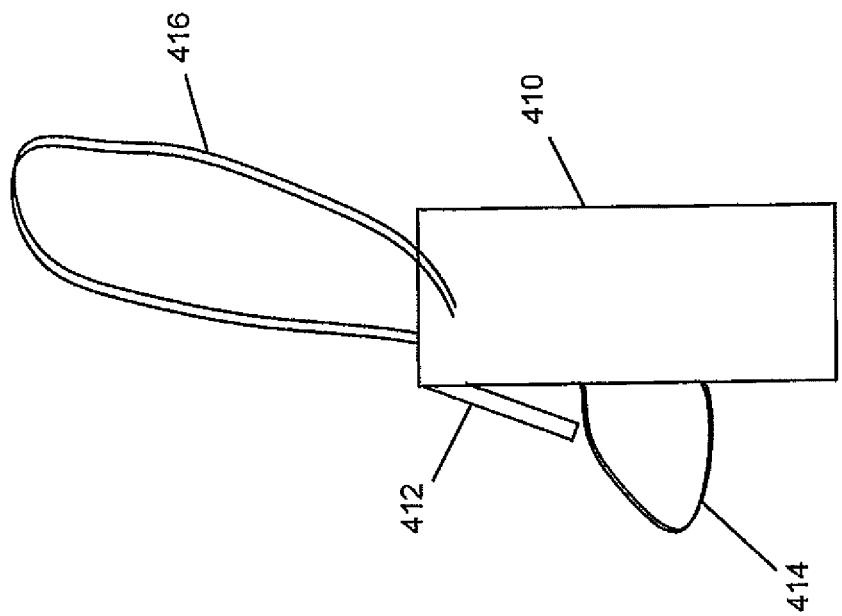
FIG. 4 illustrates a housing of a Low Power Interface, in accordance with an exemplary embodiment of the present disclosure.

As shown in FIG. 4, the Interface 104 may include a housing 410 with means for attaching the Interface 104 to the user's body or clothing such as a clip 412, arm band 414, neck loop 416 or cradle (not shown), or the like. In addition, housing 410 may be provided with means for conveniently placing the Interface 104 on a surface near a user 108, such as on the surface of a desk or table.

Figure 5:
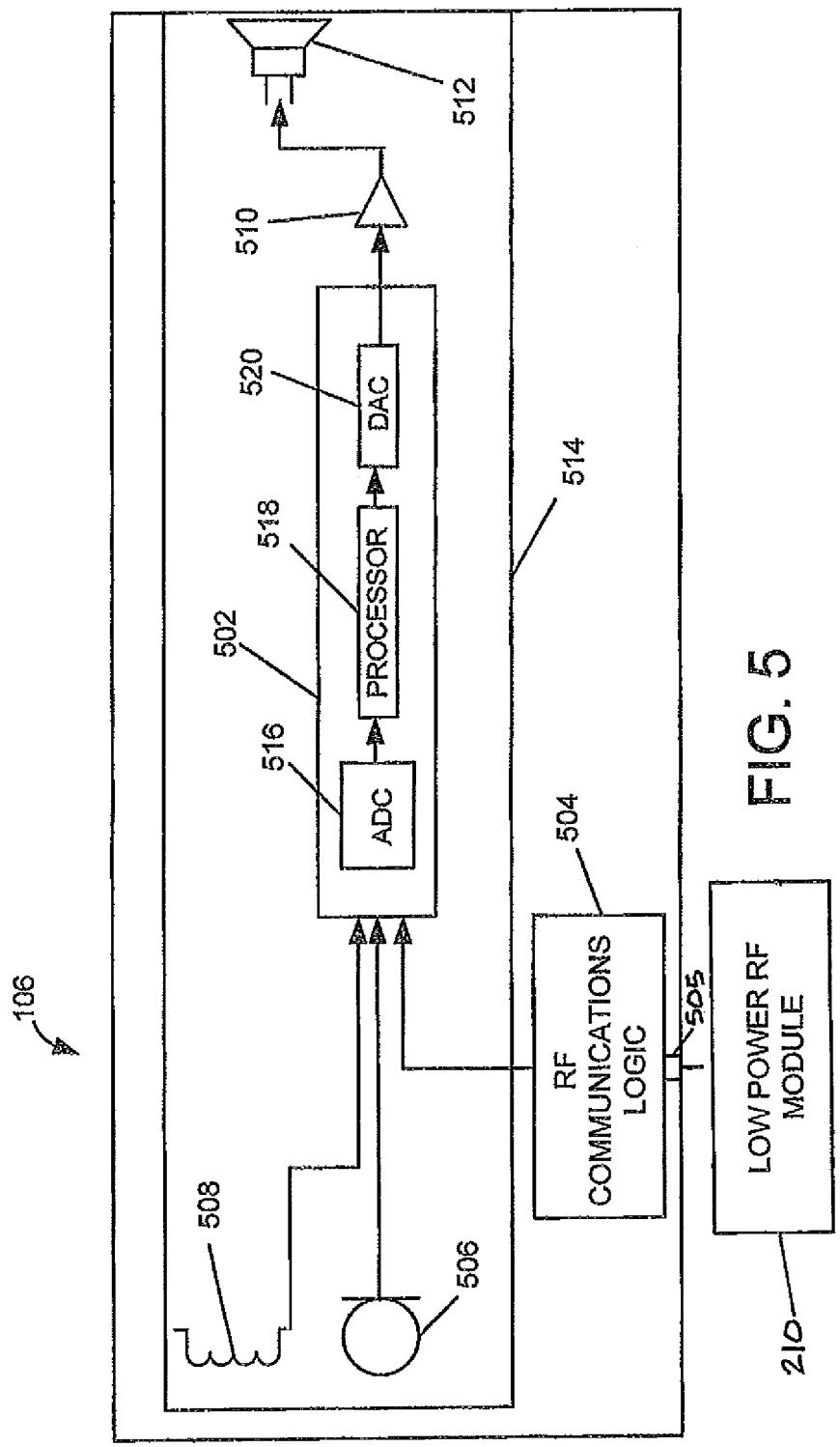
FIG. 5 illustrates a block diagram of an RF-enabled Hearing Assistive Device, in accordance with an exemplary embodiment of the present disclosure.

FIG. 5 is a block diagram of an exemplary embodiment of an RHAD 106. The RHAD 106 can include a Hearing Assistive Module (HAM) 502 and RHAD RF Communications Logic (RRCL) 504. The HAM 502 can include components for receiving and processing signals in accordance with the hearing deficiencies of the RHAD user 108 and can include components commonly found in hearing aids such as a microphone 506, a telecoil 508, an amplifier 510, and a speaker 512 as well as a signal processing circuit 514. The RHAD 106 also can include other structures known in the art, such as a power source, power switch, volume control, mode select buttons, etc., which are not shown so as not to obscure the disclosure.

In communication with the RRCL 504 at a direct audio input port 505 is a Low Power RF Module 210, an associated antenna (not shown), and an associated processor (not shown). The RRCL 504 and RF Module 210 include circuitry for establishing a communications link with the Low Power RF Communications Logic 304 of the Interface 104 and receiving and processing a Low Power RF signal from the Interface 104, as described previously. Where the RRCL 504 or RF Module 210 provides control information to the Interface 104, the RF Module 210 may also include a transmitter. These structures may be arranged on a printed circuit board or some other type of circuit that is sized to fit within a hearing aid housing. Alternatively, the RRCL 504 and RF Module 210 may be incorporated into a separate module or boot that can be attached to a hearing aid housing, such as a behind the ear (BTE) hearing aid.

The processor of the RRCL 502 may perform processing functions on signals received from Interface 104 such as signal detection, setup/control functions, frequency band, channel selection, power control, modulation, selection, interference and received signal strength monitoring. If a digital signal is being sent by the Interface 104, the processor can decode the signal. If an analog signal is being sent, the signal may be sent to an analog-to-digital converter either within the RRCL 504 or at a converter 516 in the signal processing circuit 514 of the RHAD 106, The processor may perform processing functions on the Low Power RF signal 114 received from the Interface 104, such as decompression, decoding, error detection, synchronization, and/or other functions as required.

The HAM 502 includes signal processing logic 514 for receiving and processing signals in accordance with the needs of the RHAD user 108, The signal processing circuit may include an analog-to-digital converter 516, a processor 518, and a digital-to-analog converter 520. The processor 518 processes signals received from the RRCL 504, or the RHAD's microphone 506 or telecoil 508, in accordance with the hearing deficiencies of the RHAD user 108. The processed signals are then provided to the user 108 through an RHAD speaker 512. The RHAD 106 can be adapted to operate in different modes such as a microphone, telecoil, and RF modes. For example, the RHAD 106 may be adapted to switch to an RE mode to receive the low power RF signals 114 from the Interface 104 upon a polling signal from the Interface 104. In operation, a low power RF signal 114 is received by an antenna of the RF Module 210 and processed to extract the voice signals. The voice signals are then provided to the HAM 502 for further processing and the resultant voice signals output to the RHAD user 108 at the speaker 512.

An example of a method of operation in accordance with the present disclosure will now be described. The user 108 makes or receives a phone call with a friend using the user's BWCD 102 to establish a communication link over a cellular telecommunications network 116. The friend speaks into his communications device 118 so that the friend's voice is transmitted over the cellular telecommunications network 116 to the user's BWCD 102. The BWCD 102 then passes the friend's digitized voice signals to the Bluetooth Communications Logic 302 of the Interface 104 via a Bluetooth signal 112, which is just one example of means for short range communication. The Bluetooth Communications Logic 302 passes the digitized voice signals to the CODEC/Processor Logic 306 in a bit stream format. The CODEC/Processor Logic 306 transforms the voice signal bit stream into an encoded voice signal format, decodes the voice signal, and passes it to the Low Power RF Communications logic 304. The Low Power RF Communications Logic 304 then converts the voice signal to a format expected by the RHAD 106 and transmits the voice signal to the RHAD 106 via a Low Power RE carrier signal 114. The RF Module 210 receives the Low Power RF communications signal 114 and the RRCL 504 processes the signal to extract the voice signal. The voice signal is then sent to the HAM 502 to be processed by the signal processing circuit 514 and output to the RHAD user 108 at the speaker 512. The user 108 may then respond by speaking into a microphone of the BWCD 102 so that the user's voice signal is received at the BWCD 102 and transmitted over the cellular telecommunications network 116 to the friend's communications device 118.

In an embodiment in which the Interface 104 includes an integral or remote microphone 314, the user 108 may respond by speaking into the microphone 314 so that the user's voice is received by the microphone 314 and sent to the CODEC/Processor Logic 306. The CODEC/Processor Logic 306 processes the voice signal for delivery to the Bluetooth Communications Logic 302 for transmission to the BWCD 102 via a Bluetooth signal. The CODEC/Processor Logic 306 may digitize the voice signals, create encoded speech, translate the encoded voice signals into a bit stream representation and send the voice signal to the Bluetooth Communications Logic 302 under the control of the Control Logic 310. The Bluetooth Communications Logic 302 takes the digital voice signals and passes them wirelessly to the BWCD 102, which transmits the voice signal to the friend's communications device 118 via the cellular telecommunications network 116. Because many telephones are now manufactured with Bluetooth capability many users would not need to purchase a new telephone to experience the advantages of the present disclosure, but could use their current Bluetooth-enabled phone in conjunction with the Interface 104 and RHAD 106.

It must be emphasized that the law does not require and it is economically prohibitive to illustrate and teach every possible embodiment of the present claims. Hence, the above-described embodiments are merely exemplary illustrations of implementations set forth for a clean understanding of the principles of the disclosure. Variations, modifications, and combinations may be made to the above-described embodiments without departing from the scope of the claims. All such variations, modifications, and combinations are included herein by the scope of this disclosure and the following claims.

We claim:

1. A communications interface device comprising:
   a processor; and
   a memory for storing instructions, which when executed by the processor, cause the processor to perform operations comprising:
   converting a signal, received using a first communication protocol and including an audio signal, into a format recognizable by a hearing assistive device; and
   generating a communication signal including the audio signal based on the converted signal, wherein the communication signal is transmitted to the hearing assistive device using a low power radio frequency transmission protocol that is different than the first communication protocol, and wherein the hearing assistive device extracts an audible signal from the communication signal and manipulates the extracted audible signal according to a criterion associated with a user of the hearing assistive device.

2. The communications interface device of claim 1, wherein the criterion associated with the user of the hearing assistive device is determined by the user.

3. The communications interface device of claim 1, wherein the criterion associated with the user of the hearing assistive device includes a hearing limitation associated with the user.

4. The communications interface device of claim 1, wherein the communication signal is generated for transmission to multiple hearing assistive devices.

5. The communications interface device of claim 1, wherein the signal received using the first communication protocol is received from a wireless communication device.

6. A method comprising:
   converting, by a processor, a signal received using a first communication protocol and including an audio signal into a format recognizable by a hearing assistive device; and
   generating, by the processor, a communication signal including the audio signal based on the converted signal, wherein the communication signal is transmitted to the hearing assistive device using a low power radio frequency transmission protocol that is different than the first communication protocol, and wherein the hearing assistive device extracts an audible signal from the communication signal and manipulates the extracted audible signal according to a criterion associated with a user of the hearing assistive device.

7. The method of claim 6, wherein the criterion associated with the user of the hearing assistive device is determined by the user.

8. The method of claim 6, wherein the criterion associated with the user of the hearing assistive device includes a hearing limitation associated with the user.

9. The method of claim 6, wherein the communication signals is generated for transmission to multiple hearing assistive devices.

10. The method of claim 6, wherein the signal received using the first communication protocol is received from a wireless communication device.

11. The method of claim 6, further comprising establishing a communications link with the hearing assistive device.

12. The method of claim 11, further comprising receiving control signals from the hearing assistive device via the communications link.

* * * * *